United States Patent [19]
Hodge

[11] 4,192,575
[45] Mar. 11, 1980

[54] GUIDE-CONNECTOR ASSEMBLY FOR JOINING OPTICAL FIBERS AND METHOD OF MAKING GUIDE THEREFOR

[75] Inventor: Malcolm H. Hodge, Philadelphia, Pa.

[73] Assignee: TRW Inc., Elk Grove Village, Ill.

[21] Appl. No.: 968,044

[22] Filed: Dec. 8, 1978

Related U.S. Application Data

[63] Continuation of Ser. No. 758,106, Jan. 10, 1977, abandoned.

[51] Int. Cl.² .............................................. G02B 5/14
[52] U.S. Cl. ................................................... 350/96.21
[58] Field of Search ..................................... 350/96.21

[56] References Cited

U.S. PATENT DOCUMENTS

| | | | |
|---|---|---|---|
| 889,786 | 6/1908 | Keiner | 339/75 R |
| 3,885,859 | 5/1975 | Dalgleish | 350/96.21 |
| 4,047,796 | 9/1977 | Kao et al. | 350/96.21 |
| 4,050,783 | 9/1977 | Tardy | 350/96.21 |

OTHER PUBLICATIONS

R. M. Hawk, F. Thiel, "Low Loss Splicing and Connection of Optical Waveguide Cables", SPIE vol. 63, Aug. 20, 1975, Guided Optical Communications, pp. 109–113.

*Primary Examiner*—Rolf G. Hille
*Attorney, Agent, or Firm*—Neuman, Williams, Anderson & Olson

[57] ABSTRACT

A guide member and an assembly of a guide member and connector for making an optical signal transmissive connection between the ends of a pair of single optic fibers and the method of making the guide member. The guide member is in the form of at least three predetermined length glass rods disposed in a side-by-side array and connected together along peripheral portions to form a smooth, cusp-shaped interstitial channel therebetween. The ends of the guide member's channel are open and preferably are of greater cross-sectional area than the intermediate portion of the channel to facilitate entry of an optic fiber into the channel. The guide member is disposed within a cavity in the connector. The connector is formed of a pair of mating connector members. Each member includes a first and second end with a passageway extending longitudinally therebetween and through which a respective fiber passes entering the guide member. End of the passageways includes an enlarged opening adjacent to the first end and tapering downward in cross-sectional area toward the entrance to the cavity. The cross-sectional area of the passageway at the entrance to the cavity is only slightly larger than the cross-sectional area of the optic fiber to accurately position the fiber extending therethrough and into the guide member. One or both of the connection members may include an alignment aperture to provide visual access to the interior of the cavity to ensure that each fiber is extended a predetermined distance therein such that when the connection members are connected together the fiber ends abut within the guide member in a good optical signal transmissive joint.

50 Claims, 9 Drawing Figures

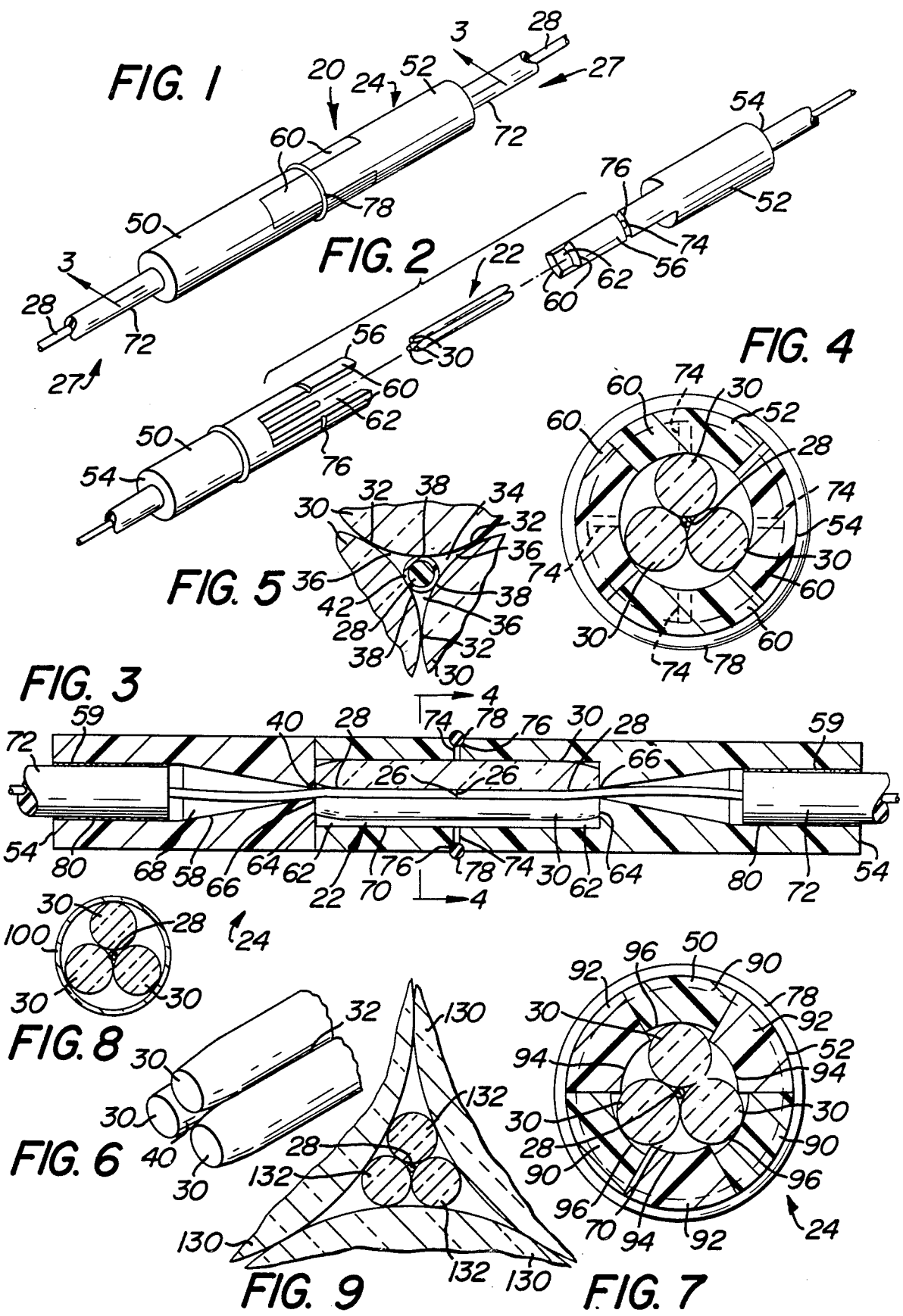

GUIDE-CONNECTOR ASSEMBLY FOR JOINING OPTICAL FIBERS AND METHOD OF MAKING GUIDE THEREFOR

This application is a continuation of application Ser. No. 758,106, filed on Jan. 10, 1977, now abandoned.

This invention relates generally to fiber optic systems and more particularly to connection means for connection of two optical fibers in end-to-end relation.

The technology of optical fiber data transmission system has advanced rapidly over the last few years and it is anticipated that such systems will gain substantial acceptance in various applications such as telephone, CATV, long and short haul data transmission, industrial process controls, aerospace and marine communication systems, etc.

At present there are two types of optical cables in use, namely, bundle cables comprising multi-filament conductors all carrying the same optical signal and single fiber cables, wherein each single fiber (if more than one) comprises a separate signal channel.

Since fiber optic systems often require connection between signal carrying fibers, connection devices must be developed to effect the end-to-end connection of optical fibers quickly and easily. In addition, the connection must be made precisely and securely to minimize coupling inefficiency (loss of light at the joint interface). As is known, there are various causes for coupling inefficiency in single fiber joints and such causes are related to the orientation, disposition and geometry of the ends of the single optical fibers at their interface or connection point. For example, transverse or lateral misalignment of the ends of the fibers with respect to each other results in a substantial signal loss across the interface which increases with increasing lateral displacement, e.g., up to approximately 4 db with a lateral displacement equal to one-half the fiber diameter. Longitudinal separation of the fiber ends or end displacement also results in a substantial signal loss which increases with increasing end separation, e.g., up to approximately 1.5 db with an end separation of one-half the fiber diameter. Axial or angular misalignment also contributes to coupling inefficiency with the loss increasing as the angle between the end faces of the optical fibers increases e.g., a loss of approximately 1 db for a five degree angle. The signal losses introduced by transverse displacement, end separation, axial misalignment, as well as the losses occasioned by Fresnel reflections, are cumulative.

Accordingly, it is of considerable importance to form a coupling wherein the fiber ends are transversely and axially aligned and are in intimate abutment with each other. Prior art connecting and splicing means have attempted to accomplish such a connection but have not been able to do so via a simple member which is inexpensive to manufacture. Nor have such connectors been readily reuseable. For example, one prior art coupling technique for splicing utilizes a square glass tube which is prefilled with a refractive index matching epoxy. The fiber ends to be joined are inserted into the tube and bent causing the tube to rotate, whereupon the fibers are forced into a corner and axially aligned. The fibers are then abutted. When the epoxy cures, a permanent joint or splice is completed. Another coupling technique makes use of a stainless steel tube having a central bore into which an index matching fluid is introduced. The optical fiber ends are inserted into the bore from opposite ends and the tubing crimped to produce a permanent joint.

While the above types of connections are relatively effective for minimizing transmission losses across the interface, the tubular couplers are difficult to use and costly to fabricate. In addition, the resulting coupling is permanent, i.e., a splice, and cannot be separated without destroying the coupling means.

Various releasably securable connections have been disclosed in the patent and technical literature. For example, an optical connector assembly utilizing various types of fiber positioning and alignment devices is disclosed in an article entitled "Demountable Connectors For Optical Fiber Systems", by M. A. Bedgood, J. Leach and M. Matthews and appearing in Electrical Communication, Volume 51, Number 2, 1976. Among the various end positioning devices disclosed therein are (1) a precision stainless steel ferrule into one end of which a watch jewel hole is mounted to align the optic fiber ends secured within the ferrule, (2) a double ferrule connection utilizing an inner ferrule in which an optical fiber is disposed and secured by epoxy resin and an outer ferrule housing the inner ferrule and (3) X-jewel connectors utilizing one ferrule into one end of which an X-jewel is secured for aligning an optic fiber adhesively secured therein and a mating ferrule having a silicone rubber cone at its tip and through which the optic fiber extends, with the cone fitting within the X-jewel when the ferrules are mated.

It has been found that one of the best alignment techniques for aligning a round optic fiber is achieved by contacting the fiber at equidistantly spaced points about its periphery. In an article entitled "Optical Wave Guide Cable Connection", by F. L. Thele and R. M. Hawk appearing in Applied Optics, November, 1976, a connector having a fiber alignment and retention guide for contacting the fiber equidistantly about its periphery is disclosed. To that end, the guide comprises an array of three equal diameter plastic or plastic coated rods. The diameter of the rods is predetermined so that the optic fiber to be aligned and retained just fits within the array and with the rods being slightly deformed by their contact with the fiber, thereby holding the fiber in place. While the rod array guide is effective for aligning and holding the fibers, the frictional engagement caused by the close contact of the plastic rods with the fiber renders longitudinal positioning of the fiber difficult. In addition, the soft material of the rod may incur surface damage during the securement operation, thereby resulting in an unnecessary source of light leakage or loss.

The use of a three rod alignment mechanism or guide in conjunction with a tubular connector is also disclosed in a paper entitled "Connecting The Thread Of Light", by Kenneth J. Fenton and Ronald L. McCartney, published at the Ninth Annual Connectors Symposium on Oct. 20th and 21st, 1976 at the Cherry Hill Hyatt House in Cherry Hill, New Jersey. The paper discloses a three rod plastic or deformable guide which is used to align and restrain a fiber end within a fiber optic terminus or connection section. The other fiber end to be joined is aligned and retained within another three rod guide mounted within a mating fiber optic connection section. The connection sections are mated and secured together via the use of a tube of elastomeric material having an "hourglass" shaped central channel into which the mated sections are inserted. While this construction is ostensibly effective for securing the optic fiber ends together in a low light loss junction, the construction is relatively complicated and would appear to require substantial manipulation to effect the proper connection.

Various other types of optical fiber connectors have been disclosed in the patent literature. For example, see U.S. Pat. Nos. 3,944,327 (Larsen), 3,944,328 (Kent et al), 3,947,182 (McCartney), 3,948,582 (Martin), 3,950,075 (Cook et al), 3,947,088 (French), 3,951,514 (Medina, Jr.) and 3,951,515 (Allard).

All of the above described prior art includes one or more disadvantages and as such the need presently exists for a viable guide-connector assembly.

Accordingly, it is a general object of this invention to provide a guide-connector assembly which overcomes the disadvantages of the prior art.

It is a further object of this invention to provide a guide-connector assembly which is simple in construction and which, in conjunction with a fiber guide, can be used to effect a low loss junction between a pair of fiber ends.

It is still a further object of this invention to provide a reuseable guide-connector assembly which facilitates the precise positioning and alignment of a pair of optical fibers together therein.

It is yet a further object of this invention to provide a guide for optic fibers for precisely aligning the fibers co-axially and which guide is adaptable for disposition within a connector assembly.

These and other objects of this invention are achieved by providing a connector and guide assembly for making an optical signal transmissive connection between the ends of a pair of single optic fibers. The assembly includes a guide member comprising at least three predetermined length glass rods. The rods lie side-by-side and parallel to one another such that longitudinal peripheral portions of adjacent rods contact and are connected to each other to form a cusp-shaped interstitial channel therebetween and extending the full length of the rods. The ends of the rods are of smaller diameter than the remaining portion of the rods so that the opening at each end of the channel is of greater cross-sectional area than the medial portion of the channel. The guide is disposed within the connector which is formed of a pair of mating members. Each connector member includes a passageway extending longitudinally therethrough for receipt of a respective fiber. Each connector member terminates in a hollow portion adjacent one end. The members are connected together at that end so that the hollow areas form a cavity for receipt of the guide member. The passageways include enlarged openings at their other or outside ends which taper downward in cross-sectional area toward the entrance of the cavity. The cross-sectional area of the passageway at the entrance of the cavity is only slightly larger than the cross-sectional area of the optic fiber extending therethrough and into the guide member. Positioning means are provided to ensure that each fiber is extended a predetermined distance into the cavity so that when the connector members are connected the fiber ends within the guide abut in a good optical signal transmissive joint.

Other objects and many of the attendant advantages of the instant invention will be readily appreciated as the same becomes better understood by reference to the following detailed description when considered in connection with the accompanying drawing wherein:

FIG. 1 is a perspective view of the guide-connector assembly of the instant invention shown connecting the ends of a pair of single optic fiber cables together;

FIG. 2 is an exploded perspective view of the guide-connector assembly of FIG. 1;

FIG. 3 is an enlarged sectional view taken along line 3—3 of FIG. 1;

FIG. 4 is a still further enlarged sectional view taken along line 4—4 of FIG. 3;

FIG. 5 is a still further enlarged fragmentary sectional view of a portion of the device as shown in FIG. 4;

FIG. 6 is an enlarged perspective view of an end of the guide member shown in FIG. 2;

FIG. 7 is a sectional view, similar to that of FIG. 4, but showing an alternative embodiment of the instant invention;

FIG. 8 is an enlarged sectional view of an alternate embodiment of the guide member embodying the invention; and FIG. 9 is an enlarged fragmentary sectional view of a second alternate embodiment of the guide member embodying the invention.

Referring now to the various figures of the drawing wherein like reference characters refer to like parts, there is shown at 20 in FIG. 1 a guide-connector assembly for use in fiber optic systems to effect the connection, be it temporary or permanent, between a pair of optical signal carrying fibers.

As will be seen in detail hereinafter, the guide-connector assembly 20 of the instant invention can be assembled quickly and easily and is particularly suitable for joining in end-to-end relation single optical fibers of jacketed cables, while maintaining the low loss and low crosstalk of the fibers. In addition, the guide-connector assembly 20 enables the fibers to be connected either permanently to form a splice, or to be readily and repeatedly connectible and disconnectible.

The guide-connector assembly basically comprises a guide member 22 disposed and held within an interior cavity (to be described in detail later) of a securable housing or connector 24. The guide member is arranged to facilitate the precise axial alignment and abutment of the ends 26 (FIG. 2) of a pair of single optical fibers 28 of a conventional jacketed cable 27 so that a good light transmissive (low loss) junction results.

The guide member comprises at least three identical elongated, rod-shaped glass members 30. The members 20 are disposed in a side-by-side parallel array with longitudinal portions abutting and integrally connected. The array of rod-shaped members forms a central interior space or channel 34 (FIGS. 5 and 6) between the rods which extends along the full length of the guide.

The interior space 34 is in the form of a central channel including plural (i.e., three) cusp-shaped interstices 36 emanating therefrom and extending the full length of the channel, with each interstice lying between a respective pair of abutting rod-shaped members. The channel 34 is arranged to receive the ends of the optic fibers to be joined to align them co-axially. The particular diameter of the rod-shaped members is selected so that the diameter of the central portion of the channel formed therebetween is just slightly larger than the diameter of the fibers to be joined. It should be pointed out at this juncture that the guide 22 may, if desired, be formed of more than three rod-shaped members 30. In such a construction the central channel will include the same number of cusp-shaped interstices as the number of rod-shaped members in the array.

In accordance with a preferred aspect of this invention the guide member 22 is formed of glass by drawing larger diameter glass rods down to the required size and into contact with each other while hot, such that the longitudinal portions of their peripheral edges contact and fuse together.

The use of glass for the material forming the guide is of substantial importance from a fabrication standpoint (glass drawing is readily accomplished) and from a functional standpoint. In regard to the latter, glass is less susceptible to shrinkage, thereby ensuring dimensional stability for the guide. In addition, the glass provides a hard, yet smooth interstitial surface which is abrasion and corrosion resistant. These features ensure that the optical fibers 26 will not be scored, scraped or otherwise damaged when inserted in the guide as will be described hereinafter, nor will the guide be damaged, either of which occurrence would result in an unnecessary light loss through the damaged surface. Further, the transparency of the glass guide member enables the viewing of the positioning of the fiber ends therein, thereby facilitating the connection of the fibers.

The cusp shape of the central channel 34 is of significant importance in that when an optic fiber is inserted within the channel the only portions of the channel which engage the fiber are the three portions 38 formed by the innermost surface portions of the rod-like members 30. The three point tangential contact of the guide member 22 enables a fiber to be inserted with very little frictional engagement between it and the guide member. In addition, since the portions 38 make contact with the fibers at equidistantly spaced locations about the periphery thereof, the fiber ends are held in place within the guide precisely axially aligned and centered.

In order to facilitate the insertion of the small diameter optical fibers into the channels 34 in the guide member 22, each open end 40 is of a greater cross-sectional area than the remaining portion of the channel (see FIG. 6). The enlargement of the openings 38 in the guide member 22 is preferably formed by dipping the ends of the guide member into an acid bath, e.g., hydrofluoric acid, to etch away or taper the free ends of the rod-like members.

The cusp-shaped interstices 36 formed between the rod-like members making up the guide serve various useful functions. For example, the presence of the interstices 36 provides an area into which any detritus of the fiber can fall instead of being pushed along by the end of the fiber to the interface of the joint. In addition, an index refraction matching fluid may be used at the interface to reduce light loss (a conventional technique). Because of the shape of the interstices the refractive index matching fluid is allowed to be forced around the sides of the mutually approaching fiber ends into the cusp shaped interstices without impeding the approach of the fiber ends as occurs if the channel is circular and closely fitting the fibers.

It should be pointed out at this juncture that the guide 22 can be used with various types of single optical fibers (e.g., plastic or glass clad fibers). The fiber 28 of the cable 27 shown herein is clad with a material 42, e.g., glass, having a lower refractive index than the body of the fiber to reduce light losses along the fiber.

In accordance with a preferred aspect of this invention the glass forming the guide member 22 is preferably selected to have the same refractive index as the cladding of the fiber thereby ensuring low loss in the connection.

Referring now to FIGS. 1 and 2, there is shown the connector 24 for holding the guide 22 therein and for securing the ends 26 of the fibers 28 in abutment within the guide. In the embodiment shown in FIGS. 1 and 2 the connector 24 comprises a pair of hermaphroditic mating connector members 50 and 52. As can be seen, members 50 and 52 are identical in size and shape. Each member is elongated and includes a pair of ends 54 and 56 with a passageway extending longitudinally therebetween and down the central axis of each member. The passageway includes an enlarged circular cylindrical opening 59 at the end 54 which extends for a substantial distance into the body of the member. The ends 56 of each member is in the form of at least two longitudinally extending fingers or prongs 60. The prongs 60 are equidistantly spaced about the periphery of the member from which they extend and define a circular cylindrical area between them. The circular cylindrical area 62 includes an end wall 64 (FIG. 3) having a central opening 66. The diameter of the central opening is slightly larger than the outside diameter of the optical fiber 28. The passageways 58 include a conically tapering portion between the enlarged opening 59 and the small diameter opening 66.

The members 50 and 52 are adapted to be connected together with their passageways 58 being co-axial by inserting the prongs 60 of member 50 between the prongs 60 of member 52. The prongs of both members are of the same length and are arcuate in cross-section to form a cylindrical wall for an enclosed cavity 70 when the members 50 and 52 are fully connected. The cavity 70 is adapted to receive and hold the guide member 22 and the fiber ends disposed therein.

The cable 27 is a conventional cable of the type wherein a single optical fiber is disposed within a protective sheath or jacket 72. In order to accommodate the jacket 72 the diameter of the enlarged opening 59 in each of the members 50 and 52 is of a slightly larger diameter than that of the jacket 72.

In order to cause the fiber ends 26 to securely abut and engage one another when the fibers 28 are extended through the respective connector portions 50 and 52, each connector portion includes means for ensuring that the associated fiber end is in a desired, predetermined position. That is, as can be seen in FIGS. 1, 2, 3 and 4, a pair of longitudinally aligned apertures 74 extend through the opposed prongs 60. The opening 74 in each prong member 60 extends half the distance from the back wall 64, as do each of the openings 74 of the member 52. Accordingly, when the connector members 50 and 52 are connected as shown in FIG. 3, the apertures 74 of all four prongs 60 are longitudinally aligned with each other and the axes thereof extend radially into the center of the cavity 70 formed between the members 50 and 42.

Each aperture 74 serves as a viewing alignment guide to enable one to position the fiber so that its end 26 is aligned with the aperture. When each end 26 of the fibers to be joined is aligned with the apertures 74 of its respective connector member and when those members are secured together, the ends 26 of each fiber abut. In order to ensure that a good connection occurs, irrespective of slight imperfections in the end surface of the fiber ends 26, it is preferable that the fiber ends be positioned so that their end surface extends slightly beyond the center of aperture 74, whereupon each fiber end will extend slightly more than halfway into the cavity 70. Accordingly, when the members 50 and 52 are secured together the ends 26 abut firmly and the fibers 22 flex or bend slightly within the tapered portion 68 of the passageway 58 (see FIG. 5). The flexure of the fibers provides a biasing force to maintain intimate engagement under compression between the abutting fiber ends 26.

In order to maintain a secure connection between the connected fibers an arcuate recess 76 is provided in each of the prongs 60 which is longitudinally aligned with and contiguous with the apertures 74. When the members 50 and 52 are connected together the recess 76 forms an annular groove extending about the entire periphery of the completed connector 24. A sealing O-ring 78 is then disposed in the groove which covers the aperture 74. and serves to hold the members 50 and 52 of connector 24 together. The portion of the recess 76 may be moved longitudinally from the position wherein the apertures 74 are covered by O-ring 78.

Connection of a typical pair of single optical fiber cables is as follows: the jacketing 72 is removed from the end of the cables to be connected to expose the single optical fiber 28 in each cable. Where the cable is of conventional construction there is nothing between jacket 72 and the optical fiber. Accordingly, with conventional cables, an epoxy adhesive is placed at the end of the jacket 72 of each cable so that the length of optical fiber extending out of the jacket is fixed. After the epoxy adhesive dries, one cable end with the exposed fiber is inserted into passageway 58 of one member 50 of the connector 22, with the jacket 72 of the cable being disposed within the enlarged opening 59 and with the optical fiber extending through tapering passageway 58 and small central opening 66 into the cylindrical space 62 between prongs 60.

The fiber end 26 is positioned longitudinally within the space 62 by looking through aperture 74 and moving the cable longitudinally until the fiber end 26 is seen extending slightly beyond the mid-point of the aperture. The cable is then secured in place by introduction of an epoxy adhesive 80 between the cable jacket 72 and the wall of enlarged opening 59. The end of the other fiber 28 of the other cable is positioned and secured within member 52 in an identical manner.

Where a removable connection is to be made, the channel in guide member 22 is preferably filled with a conventional oil having an index of refraction which matches that of the optic fibers. In order to make a permanent splice, the channel of the guide member is preferably filled with an epoxy adhesive having a matching refractive index to that of the optic fiber.

The guide member 22 is then telescoped over one end of the first fiber by inserting said end in the enlarged opening 40 in the guide member 22. The guide member is then moved longitudinally relative to the fiber end so that the fiber end which is within cavity 70 extends substantially its full length within the guide member 22. During this operation the fiber end 26 is automatically aligned with the enlarged opening 40 in the guide member 22 by the interaction between said guide member and the prongs 60 of member 52. The portion 52 of the connector is then connected to member 50 by inserting the prongs 60 of member 52 between prongs 60 of member 50. The end 26 which is secured to member 50 is automatically aligned with the enlarged opening 40 in the guide member 22 which is already positioned in the cavity 70 of member 52 by the interaction between the prongs 60 of members 50 and 52. The connector members 50 and 52 are then moved relative to each other to the position shown in FIG. 3, whereupon the ends 26 of each of the fibers 28 abut and form a good, low loss optically transmissive joint. The O-ring 78 which had been previously placed about the cylindrical portion of either connector member 50 or 52, is then rolled into position within groove 76 to close and secure the connector 24.

As should be appreciated from the foregoing the guide-connector assembly 20 of the instant invention enables the quick and efficient end-to-end connection of a pair of single optical fibers. This joint may be readily disconnected, if desired, by the removal of the O-ring 78 from the peripheral recess 76, thereby unlocking the two portions 50 and 52 of the connector 24. The connector portions 50 and 52 are then separated, thereby disconnecting the fiber ends 26. Reconnection of the fiber ends can be accomplished as described heretofore.

It should also be seen that while the guide-connector assembly of the instant invention is particularly suitable for making releasable connections it is also useable to make a permanent connection or splice between the fibers by using an adhesive, such as an index matching epoxy rather than an index matching oil, in the guide member 22 to secure the fiber ends therein.

Another advantage of the preferred connector members is the hermaphroditic construction which enables both of the connector members to be identical. This enables less expensive production and does not require additional time to make connections while making certain that one male and one female connector member is used.

Still another advantage of the connector member is the pair of elongated prongs on each connector member which acts to facilitate alignment of the channel of the guide member with the fiber end. The portions of the prongs beyond the alignment apertures receives the guide member and simultaneously aligns the channel of the guide member with the fiber end 26 as the prongs are telescoped over the guide member.

In FIG. 7 there is shown a cross-sectional view of an alternative embodiment of the connector 24 of the instant invention. In the embodiment shown in FIG. 7 each connector member 50 and 52 includes three longitudinally extending prongs or fingers. The prongs 90 are equidistantly spaced about the periphery of the connector member 50 while prongs 92 are equidistantly spaced about the periphery of the connector member 52. As can be seen, the wall of each of the prongs 92 is thicker than the wall of each of the prongs 90. Accordingly, when the connector members 50 and 52 are united by the interlacing of their prongs 90 and 92 (in the same manner as described heretofore) the arcuate inside surface 94 of each of the prongs 92 extends further into the cavity 70 than does the arcuate inside surface 96 of each of the prongs 90. The rod-like members 30 of the guide member 22 fit into the space formed between immediately adjacent prongs 92, thereby precluding the guide member 22 from rotating about its central axis when disposed within cavity 70 of connector 24.

While the guide-connector assembly 20 of the embodiment shown in the drawing effects the connection of only one pair of single optical fibers, it is clear that the guide member 22 can be modified so that the array includes plural rod-shaped members disposed parallel to one another and connected along abutting longitudinal contact points to define plural cusp-shaped interstitial channels therebetween, with each channel being adapted to receive a pair of abutting ends of single optical fibers. The connector 24, to accomodate such a guide member, includes a plurality of passageways extending therethrough, each aligned with a respective one of the cusp-shaped interstitial channels in the guide member. The guide-connector assembly so formed is suitable for connecting plural pairs of single optical fibers together.

It should also be noted that the plural rod-shaped members are not required to be the same diameter relative to each other. Where the diameters are different, it allows both interstitial hole size and interstitial hole spacing to accomodate an array or cable of multiple fibers.

An alternate embodiment of the guide member is shown in cross-section in FIG. 8. The plural rod-shaped glass members 30 are fabricated within an embracing hollow glass tube 100. The inside diameter of the tube matches the outside diameter of the three joined parallel rods 30. This construction enables the outside surface of the guide member to be a regular cylinder and adds not only strength to the guide member assembly but also enables the guide member to fit smoothly within the cavity 70 of connector 24 formed within the prongs.

A second alternate embodiment of the guide member is shown in FIG. 9. The guide member shown in FIG. 9 is provided to accommodate optical fibers of extremely small diameter. That is, where optical fibers having a diameter as small or smaller than 3 mils requires connection, the guide member constructed, as shown in FIGS. 4 through 8, is of extremely small outer diameter and therefore lacks structural rigidity as a result of the small outside diameter.

In order to strengthen the overall construction, the guide member comprises not only a plurality of parallel rods which are of a size to accommodate the fiber ends, but also a plurality of rods which are of a substantially larger diameter, which accommodates the smaller guide member in the interstitial channel thereof.

Accordingly, the alternate embodiment shown in FIG. 9 includes a plurality of glass rods 130 which form an outer guide member and a plurality of smaller diameter glass rods 132 which form the inner guide member. The outer guide member shown in FIG. 9 comprises three parallel rods 132 which are drawn when heated to form a guide member similar to that shown at 22 in FIG. 2.

The inner guide member formed of rods 132 is also formed of three rods which are heated and formed to make a smaller guide member which is otherwise similar in construction to the outer guide member. The channels formed within both the inner and the outer guide members are widened at the ends in the same manner as guide member 22. The channel in the outer guide member thus receives the inner guide member formed of rods 132 by telescoping the outer guide member over the inner guide member.

The inner guide member and outer guide member are both of substantially the same length with the optical fiber 28 being fit wi hin the channel in the smaller guide member comprised of rods 132. The guide member shown in FIG. 9 is particularly useful for connecting fibers having diameters as small as or smaller than three mils.

While all of the embodiments of the guide members shown herein utilize rod-shaped members of solid construction, it should be understood that the reference to rod-shaped in both the specification and claims is intended to encompass hollow cylindrical members as well as solid members.

Without further elaboration, the foregoing will so fully illustrate my invention that others may, by applying current or future knowledge, readily adapt the same for use under various conditions of service.

What is claimed as the invention is:

1. A guide for use in making an optical signal transmissive connection between the ends of a pair of optic fibers, said guide being an integral unit comprising at least three predetermined length glass rods, said guide being formed by disposing said rods in a side-by-side array parallel to one another with the longitudinal peripheral portions of adjacent rods in contact with each other while said rods are hot to cause them to fuse together at said portions to form an integral unit having a fixed size cusp-shaped interstitial channel whose surface is smooth, said channel being arranged to guide the ends of a pair of optic fibers into abutment and precise axial alignment and including a pair of open ends, the open ends of said channel being of greater cross-sectional area than the intermediate portion of the channel.

2. The guide of claim 1 wherein the index of refraction of the glass rods is lower than the index of refraction of the optic fibers.

3. The guide of claim 1 wherein said guide further includes a cylindrical tube which extends about and embraces said rods.

4. The guide of claim 1 and further including a plurality of at least three glass rods of predetermined length which are of a diameter substantially larger than said first mentioned glass rods, said second set of glass rods being disposed in a side-by-side array parallel to one another with longitudinal peripheral portions of adjacent rods in contact and connected to each other to form a cusp-shaped interstitial channel therebetween, said first named rods being disposed within the interstitial channel of said second plurality of rods.

5. A connector for making an optical signal transmissive connection between the ends of a pair of optic fibers disposed within a guide member, said connector comprising a pair of members, each including a first and second end with a passageway extending longitudinally therebetween, through which a fiber passes, and terminated in a hollow portion adjacent said second end, said members being connected together at their second ends and with their hollow areas forming a longitudinally extending cavity for receipt of a guide member comprising at least three predetermined length glass rods and being formed by disposing said rods in a side-by-side array parallel to one another with the longitudinal peripheral portions of adjacent rods in contact with each other while said rods are hot to cause them to fuse together to form an integral unit having a cusp-shaped interstitial channel whose surface is smooth for holding the fiber ends, said passageway including an enlarged opening adjacent said first end and a smaller opening adjacent said second end and forming the entrance to the cavity, said passageway tapering downward from the larger opening to the smaller opening, said smaller opening being only slightly larger than the cross-sectional area of said optic fiber and being aligned with said channel to accurately position the fiber extending therethrough into the guide member, each of said connector members including positioning means to ensure that each fiber is extended a predetermined distance therein such that when said members are connected the fiber ends abut within said guide member in a good optic signal transmissive joint.

6. The connector of claim 5 wherein said positioning means comprise at least one aperture to provide visual access to the portion of the cavity in which the fiber end is to be located.

7. The connector of claim 6 wherein the connection between said connector members is releasably securable.

8. The connector of claim 7 wherein the second ends of said connector members are identical in shape to form a hermaphroditic connection.

9. The connector of claim 8 wherein the second end of each of said connector members includes at least two longitudinally extending spaced prongs, with the prongs of one member being disposed and held between the prongs of the other member when the members are connected.

10. The connector of claim 9 wherein said positioning apertures are provided in each of said prongs.

11. The connector of claim 10 including means to secure the connector members together.

12. The connector of claim 11 wherein said securing means comprises an O-ring disposed around said prongs.

13. The connector of claim 12 wherein a recess is provided in each of said prongs and an annular groove is formed when said connector members are secured together, said O-ring being disposed within said annular groove to fixedly secure said connection members together.

14. The connector of claim 13 wherein each of said optical fibers is disposed within a jacketed cable and wherein the enlarged opening in each of the connector members is of sufficient size for receipt of the jacketed cable.

15. The connector of claim 5 wherein said connector members each include a pair of elongated prongs, said prongs extending beyond the end of said optical fiber end so that said prongs align the guide member to receive the fiber end as the guide member is inserted in the prongs of said connector member.

16. A connector and guide assembly for making an optical signal transmissive connection between the ends of a pair of optic fibers comprising a connector having a guide member disposed therein, said guide member comprising at least three predetermined length glass rods, and being formed by disposing said rods in a side-by-side array parallel to one another with the longitudinal peripheral portions of adjacent rods in contact with each other while said rods are hot to cause them to fuse together to form an integral unit having a cusp-shaped interstitial channel whose surface is smooth and having a pair of open ends, the ends of said channel being of greater cross-sectional area than the intermediate portion of said channel, said connector comprising a pair of members, each including a first and a second end with a passageway extending longitudinally therebetween through which respective optic fibers pass and terminating in a hollow portion adjacent to the second end, the connector members being connected together at their second ends with their hollow areas forming a longitudinally extending cavity in which said guide member is disposed, each of said passageways including an enlarged opening adjacent the first end and a smaller opening adjacent said second end forming the entrance to said cavity, said passageway tapering downward from the larger opening to the smaller opening, said smaller opening being only slightly larger than the cross-sectional area of the optic fiber and aligned with the channel in said guide member to accurately position the fiber extending therethrough and into the guide member, each of said connector members including positioning means to ensure that each fiber is extended a predetermined distance therein, such that when said connector members are connected together the fiber ends abut within the guide member in a good optical signal transmissive joint.

17. The guide-connector assembly of claim 16 wherein said positioning means comprise at least one aperture to provide visual access to the portion of the cavity in which the fiber end is to be located.

18. The guide-connector assembly of claim 17 wherein said connector members include at least two longitudinally extending spaced prongs at their second ends, with the prongs of one connector member being disposed and held between the prongs of the other connector member when the connector members are connected and wherein each prong includes at least one of said apertures therein.

19. The guide-connector assembly of claim 18 and further comprising means for fixedly securing said connector members together.

20. The guide-connector assembly of claim 19 wherein said last mentioned means comprises an O-ring disposed within a groove extending about the periphery of said connector when said connector members are connected together.

21. The guide-connector assembly of claim 17 wherein said connector members include at least three longitudinally extending prongs at their second ends, with the prongs of one connector being disposed and held between the prongs of the other connector member when the connector members are connected and wherein each prong includes at least one of said apertures therein.

22. The guide-connector assembly of claim 21 wherein the prongs of one connector member are thicker walled than the prongs of the other connector member such that when said guide is disposed within said cavity the rod-like members thereof are disposed between the thicker walled prongs to preclude rotation of the guide member about its central axis.

23. The guide of claim 1 wherein said rods are straight.

24. The guide of claim 1 wherein said cusp-shaped interstitial channel includes a central portion which receives said fibers and is approximately the same diameter as said fibers for aligning opposed fiber ends disposed therein.

25. A guide for use in making an optical signal transmissive connection between the ends of a pair of optic fibers, said guide being an integral unit comprising at least three predetermined length glass members having cylindrical surface portions, said guide being formed by disposing said members in a side-by-side array parallel to one another, with longitudinal peripheral portions of adjacent members in contact with each other while said members are hot to cause them to fuse together at said portions to form an integral unit having a fixed size, cusp-shaped interstitial channel extending through said unit and having open ends, said channel having smooth surfaces, whereby said surfaces guide the ends of a pair of optic fibers inserted into said channel into immediate proximity with each other to form a good optical signal transmissive joint.

26. The guide of claim 26 wherein said members are solid rods.

27. The guide of claim 25 wherein the open ends of said channel are of greater cross-sectional area than the intermediate portion of said channel to facilitate entry of an optic fiber into the channel.

28. The guide of claim 25 wherein said members are straight rods.

29. The guide of claim 26 wherein the index of refraction of the glass members is lower than the index of refraction of any medium interposed between the ends of the fibers in said channel.

30. The guide of claim 25 wherein said guide further includes a cylindrical tube which extends about and embraces said cylindrical members.

31. The guide of claim 25 further including a plurality of at least three cylindrical members of a predetermined length which are of a diameter substantially larger than said glass members, said larger diameter members being disposed in a side-by-side array parallel to one another with longitudinal peripheral portions of adjacent members in contact and connected to each other to form a cusp-shaped interstitial channel therebetween, said glass members being disposed within the interstitial channel of said larger diameter cylindrical members.

32. The guide of claim 30 wherein said cylindrical members are also formed of glass.

33. A connector for making an optic signal transmissive connection between the ends of a pair of optic fibers, said connector comprising first and second mateable connecting portions and a guide member comprising at least three predetermined length glass members having cylindrical surface portions disposed in a side-by-side array parallel to one another, with the longitudinal peripheral portions of adjacent members fused together to form an integral unit having a cusp-shaped interstitial channel whose surfaces are smooth, whereby said surfaces guide the ends of a pair of optic fibers inserted into said channel into immediate proximity with each other to form a good optical signal transmissive joint.

34. The connector of claim 33 additionally comprising means for guiding the ends of a pair of optic fibers into said channel.

35. The connector of claim 33 additionally comprising means for retaining said guide member within said connector.

36. The connector of claim 35 wherein each of said mateable connecting members includes a first and a second end with a passageway extending longitudinally therebetween for passing an optic fiber therethrough, said passageway in at least one of said connector members terminating in a hollow portion adjacent said second end, said members being mateable together at their second ends and with at least one hollow area forming a longitudinally extending cavity for receipt of said guide member.

37. The connector of claim 36 wherein the means for guiding the fiber comprise an enlarged opening in each member adjacent to the first end and smaller opening adjacent to the second end and forming an entrance to the cavity, said passageway in each member tapering downward intermediate said first and second end from the larger to the smaller opening, with said smaller opening being only slightly larger than said optic fiber and being aligned with said channel.

38. The connector of claim 37 wherein each of said members includes positioning means to ensure that each fiber is extended a predetermined distance therein such that when said members are connected the fiber ends are in such close proximity to each other within said guide member to form a good optical signal transmissive joint.

39. The connector of claim 38 wherein said positioning means comprise at least one aperture to provide visual access to the portion of the cavity in which the fiber end is to be located.

40. The connector of claim 34 further comprising means for releasably securing said members together.

41. The connector of claim 40 wherein the second ends of said members are identical in shape to form a hermaphroditic connection.

42. The connector of claim 41 wherein the second end of each member includes at least two longitudinally extending spaced prongs, with the prongs of one member being disposed and held between the prongs of the other member when the members are connected.

43. The connector of claim 42 wherein said positioning apertures are provided in at least the prongs of one of said members.

44. The connector of claim 43 wherein said securing means comprises an O-ring disposed about said prongs.

45. The connector of claim 44 wherein a recess is provided in each of said prongs forming a groove around the outside of the connector when said members are secured together, said O-ring being disposed within said annular groove to fixedly secure said connection members together.

46. A method of making a guide for effecting an optical signal transmissive connection between the ends of a pair of optic fibers, said guide being formed as an integral unit by arranging at least three elongated glass members having cylindrical surface cylindrical glass portions in a side-by-side array parallel to one another, with longitudinal peripheral portions of said members in contact with each other while said members are hot to cause them to fuse together to form an integral unit having a fixed size, cusp-shaped interstitial channel whose surfaces are smooth.

47. The method of claim 46 wherein said cylindrical glass members are drawn while hot.

48. The method of claim 47 wherein said cylindrical glass members are solid rods.

49. The method of forming an optic fiber guide for joining two optic fiber ends in an optical signal transmissive connection, the steps comprising disposing at least three glass rods having cross-sectional areas larger than that of the eventually desired sectional areas in a side-by-side array parallel to one another, heating and drawing said rods so as to reduce the sectional size thereof, the rods being fused together while hot and forming an interstitial channel therebetween to accommodate said fibers.

50. The method of claim 49 in combination with the steps of inserting optic fibers to be connected in opposed ends of the formed guide interstitial channel until the fiber ends form a good optical signal transmissive connection.

* * * * *

UNITED STATES PATENT AND TRADEMARK OFFICE
CERTIFICATE OF CORRECTION

PATENT NO. : 4,192,575
DATED : March 11, 1980
INVENTOR(S) : Malcolm H. Hodge

It is certified that error appears in the above–identified patent and that said Letters Patent are hereby corrected as shown below:

Abstract, line 18, change "End" to -- Each --

Claim 26, column 13, line 1, change "26" (second occurrence) to -- 25 --

Claim 29, column 13, line 9, change "26" to -- 25 --

Signed and Sealed this

Twenty-third Day of September 1980

[SEAL]

Attest:

SIDNEY A. DIAMOND

Attesting Officer

Commissioner of Patents and Trademarks